Patented Oct. 17, 1939

2,176,347

UNITED STATES PATENT OFFICE 2,176,347

METHOD OF PREPARING A FOOD PRODUCT

Edward G. Jansen, Sheboygan, Wis.

No Drawing. Application July 26, 1937,
Serial No. 155,733

4 Claims. (Cl. 99—100)

My invention relates to a process of preparing a food product from potatoes or starchy vegetables of similar composition and to the product thereof and the objects of my invention are, first, to provide a process of preparing a food product from potatoes or starchy vegetables of similar composition which will not deteriorate or discolor upon exposure to the air and, second, to provide such a process and product thereof which will fully comply with all pure food laws.

I attain these objects by the following process; the process being described with particular reference to the preparation of a food product from potatoes. The potatoes are first peeled and then, preferably, immersed in cool or cold water to soak. The length of time of this soaking is variable within wide limits however I have found that the best results are obtained when this soaking is extended over a period of about twenty-four hours. The object of this soaking is to cleanse the potatoes and also to cause them to absorb the maximum quantity of water and the step, although desirable for the best results, may be omitted under certain circumstances.

The potatoes are then removed and immersed in a treating bath of a solution adapted to preserve the potatoes against discoloration. For this purpose I prefer to use an edible or potable organic acid such as acetic acid, citric acid, etc. It is, of course known that these substances have a preservative effect when present in the final food product in sufficient quantity to inhibit bacterial action. However, in such a case, they impart their characteristic taste and flavor to the food product and hence their use is limited to instances where such flavor is not objectionable.

My process does not contemplate the use of these substances to inhibit bacterial action but only as a treating bath which is subsequently removed so that the natural taste and flavor is not impaired.

I have also found that the addition of sodium chloride or ordinary table salt improves the action of the treating bath.

I prefer to use a treating bath comprising one quart of acetic acid of the concentration of ordinary commercial vinegar, three ounces of citric acid and three ounces of salt in two gallons of water.

This bath may be varied within wide limits. Half of the above quantities will have appreciable effect in preventing discoloration while the quantity may be increased to any desired amount. However, since any residue of the treating bath left in the final product will impart a characteristic sour or acid taste thereto which is not desirable, it is preferable to use as low a concentration as will have the desired effect as such a solution may be completely removed more readily than a concentrated solution.

Although I obtain the best results from the above solution either the acetic acid or the citric acid may be used alone with satisfactory results or either may be substituted by other potable organic acids.

The potatoes are left immersed in the treating bath for seventy-two hours and then removed from the treating bath and thoroughly rinsed to remove all of the treating bath adherent thereto as well as any dirt or foreign matter not previously removed.

The potatoes are then grated, macerated or otherwise treated to reduce them to a finely divided or comminuted state. This operation, as well as those previously described, may be carried out by the use of suitable machinery upon a production basis. Types of machines for performing this operation being well known and the specific means used forming no part of this invention, it is not described or illustrated herein.

The resulting product is then passed over a screen and the juice or liquid resulting from the maceration of the potatoes allowed to drain off, leaving the flesh or pulp on the screen. It will be found that a portion of the starch originally in the potato is held in suspension or emulsion in the liquid and passes through the screen with it, the exact proportion varying with the degree of fineness to which the potatoes are reduced, the amount of agitation of the pulp and liquid, etc.

This removal of the starch normally in the potato may be omitted if desired although I prefer to employ it since it results in a lighter, more digestable and more palatable article of food when made into a potato pancake or similar article of food.

Any residue of the treating bath not removed by the rinsing process is drained off with the liquid when this step of the process is carried out.

I prefer to dehydrate the resultant product and market in that state, either with the addition of flour and other suitable ingredients or alone. If desired, however, the product may be packed in the moist state in cans or jars as it will keep perfectly and is free from the objectionable blackening or discoloration which attends the exposure of untreated potatoes to the atmosphere.

Since only potable or edible substances are used in its preparation the product complies with all pure food laws.

I claim:

1. The process of preparing a food product from potatoes, comprising soaking the potatoes in a solution containing approximately one quart of acetic acid of the concentration of ordinary commercial vinegar, three ounces of citric acid, three ounces of sodium chloride and two gallons of water for approximately seventy-two hours, removing the potatoes and rinsing to remove said solution from the potatoes.

2. The process of preparing a food product from potatoes comprising soaking the potatoes in a solution comprising acetic acid in a concentration in excess of one pint of acetic acid of the concentration of commercial vinegar and citric acid in excess of one and one-half ounces per solution containing two gallons of water for approximately seventy-two hours, removing the potatoes therefrom and rinsing to remove said solution from the potatoes.

3. The process of preparing a food product from potatoes comprising soaking the potatoes in a solution containing acetic acid in a concentration in excess of a pint of acetic acid of the concentration of commercial vinegar and citric acid in excess of one and one-half ounces per solution containing two gallons of water for approximately seventy two hours, removing the potatoes therefrom rinsing to remove said acid solution from the potatoes and macerating said potatoes and draining the resultant juice therefrom together with a portion of the starch in suspension therein.

4. The process of preparing a food product from potatoes comprising soaking the potatoes in a solution of citric acid in a concentration in excess of three-quarters ounce per gallon of water for approximately seventy two hours, removing the potatoes therefrom and rinsing to remove said acid solution from the potatoes.

EDWARD GEO. JANSEN.